(12) United States Patent
Khosla et al.

(10) Patent No.: US 7,702,675 B1
(45) Date of Patent: Apr. 20, 2010

(54) AUTOMATED CATEGORIZATION OF RSS FEEDS USING STANDARDIZED DIRECTORY STRUCTURES

(75) Inventors: Aditya Khosla, Sunnyvale, CA (US); Brock D. LaPorte, San Carlos, CA (US); Alberto Cobas, Scotts Valley, CA (US); Colin Chang, San Jose, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 11/558,910

(22) Filed: Nov. 11, 2006

Related U.S. Application Data

(63) Continuation-in-part of application No. 11/424,452, filed on Jun. 15, 2006, which is a continuation-in-part of application No. 11/197,681, filed on Aug. 3, 2005.

(60) Provisional application No. 60/736,553, filed on Nov. 13, 2005.

(51) Int. Cl.
*G06F 17/30* (2006.01)

(52) U.S. Cl. .................. 707/710; 707/731; 709/203; 709/217

(58) Field of Classification Search .................. None
See application file for complete search history.

(56) References Cited

U.S. PATENT DOCUMENTS

| | | | |
|---|---|---|---|
| 6,208,995 B1 | 3/2001 | Himmel et al. | |
| 6,782,430 B1 * | 8/2004 | Cragun | 709/245 |
| 6,784,900 B1 | 8/2004 | Dobronsky et al. | |
| 6,868,525 B1 * | 3/2005 | Szabo | 715/738 |
| 6,959,339 B1 | 10/2005 | Wu et al. | |
| 7,031,961 B2 | 4/2006 | Pitkow et al. | |
| 7,080,139 B1 * | 7/2006 | Briggs et al. | 709/224 |
| 7,181,438 B1 | 2/2007 | Szabo | |
| 7,366,996 B2 | 4/2008 | Hoyle | |
| 7,373,358 B2 * | 5/2008 | Ronnewinkel et al. | 707/102 |
| 2003/0184583 A1 | 10/2003 | Lim | |
| 2003/0212904 A1 | 11/2003 | Randle et al. | |

(Continued)

FOREIGN PATENT DOCUMENTS

GB  2352600 A  1/2001

(Continued)

OTHER PUBLICATIONS

Daniel P. Lulich, "Categorizing the Web Bootstrapping Personalized Content Management", Rulespace, Apr. 2001, pp. 1-12.*

(Continued)

*Primary Examiner*—Apu M Mofiz
*Assistant Examiner*—Hung D Le
(74) *Attorney, Agent, or Firm*—Workman Nydegger

(57) ABSTRACT

A method and system for creating a database of categorized web feeds for facilitating web feed organization is disclosed. One exemplary method includes ascertaining a web feed identifier and searching a categorized collection of websites to determine a hierarchical folder path for the web feed identifier. For example, the Open Directory Project may be searched to determine an appropriate hierarchical folder path for the web feed identifier. The web feed identifier is placed in a corresponding hierarchical folder path within the database of categorized web feeds. The database of categorized web feeds can then be used as a tool for organizing web feeds on a client computer.

18 Claims, 9 Drawing Sheets

U.S. PATENT DOCUMENTS

| | | | |
|---|---|---|---|
| 2004/0001081 A1 | 1/2004 | Marsh | |
| 2004/0003118 A1 | 1/2004 | Brown et al. | |
| 2004/0049514 A1* | 3/2004 | Burkov | 707/100 |
| 2004/0189695 A1 | 9/2004 | Kurtz et al. | |
| 2004/0267779 A1 | 12/2004 | Carter et al. | |
| 2005/0050472 A1 | 3/2005 | Faseler et al. | |
| 2005/0165615 A1 | 7/2005 | Minar | |
| 2005/0188403 A1 | 8/2005 | Kotzin | |
| 2005/0198056 A1* | 9/2005 | Dumais et al. | 707/101 |
| 2005/0203917 A1 | 9/2005 | Freeberg et al. | |
| 2005/0216825 A1 | 9/2005 | Teague | |
| 2005/0283734 A1 | 12/2005 | Santoro et al. | |
| 2005/0289468 A1* | 12/2005 | Kahn et al. | 715/738 |
| 2006/0073812 A1 | 4/2006 | Punaganti et al. | |
| 2006/0095507 A1* | 5/2006 | Watson | 709/203 |
| 2006/0167860 A1* | 7/2006 | Eliashberg et al. | 707/3 |
| 2006/0173985 A1* | 8/2006 | Moore | 709/223 |
| 2006/0230021 A1* | 10/2006 | Diab et al. | 707/3 |
| 2006/0265396 A1 | 11/2006 | Raman et al. | |
| 2006/0288011 A1* | 12/2006 | Gandhi et al. | 707/10 |
| 2007/0011665 A1* | 1/2007 | Gandhi et al. | 717/136 |
| 2007/0016609 A1* | 1/2007 | Kim et al. | 707/104.1 |
| 2007/0050734 A1* | 3/2007 | Busey | 715/853 |
| 2007/0083520 A1 | 4/2007 | Shellen et al. | |
| 2007/0094389 A1* | 4/2007 | Nussey et al. | 709/225 |
| 2007/0198943 A1* | 8/2007 | Grason et al. | 715/776 |
| 2009/0013266 A1* | 1/2009 | Gandhi et al. | 715/760 |

FOREIGN PATENT DOCUMENTS

| | | |
|---|---|---|
| WO | WO 2007/019380 | 2/2007 |

OTHER PUBLICATIONS

U.S. Appl. No. 10/826,480, Oct. 20, 2005, Apparao et al.
Home page for Syndic8.com, Nov. 12, 2004[1] [online] [retrieved on Jan. 4, 2007], 3 pgs. Retrieved from the Internet: http://web.archive.org/web/20041112060816/http://www.syndic8.com/.
"What is RSS?," by Mark Pilgrim, Dec. 18, 2002[2], [online] [retrieved on Jan. 4, 2007], 7 pgs. Retrieved from the Internet: http://www.xml.com/lpt/a/2002/12/18/dive-into-xml.html.
"TwoPeaks Releases Free MobileRSS Beta," Janak Parekh, Aug. 28, 2003[3] [online] [retrieved on Jan. 4, 2007], 5 pg. Retrieved from the Internet: http://www.pocketpcthoughts.com/forums/viewtopic.php?p=156370.
"A better PDA news aggregator!," by Marc, Jan. 3, 2004[4], [online] [retrieved on Jan. 4, 2007], 2 pgs. Retrieved from the Internet: http://blogs.officezealot.com/marc/archive/2004/01/03/2156.aspx.
*Internet Archive, Frequently Asked Questions*; http://www.archive.org/about/faqs.php; Dec. 6, 2006; 46 pages.
U.S. Appl. No. 11/197,681, filed Aug. 3, 2005, Khosla et al.
U.S. Appl. No. 11/424,452, filed Jun. 15, 2006, O'Shaughnessy et al.
U.S. Appl. No. 11/197,681, filed Dec. 18, 2006, Non-Final Office Action.
U.S. Appl. No. 11/197,681, filed Aug. 8, 2007, Final Office Action.
U.S. Appl. No. 11/197,681, filed Mar. 18, 2008, Non-Final Office Action.
U.S. Appl. No. 11/197,681, filed Sep. 3, 2008, Final Office Action.
Java.net, *The Source for Java Tecchnology Collanoration*, rome. https://rome.dev.java.net.
*Using AdvantGo Mobile Inspection 2.0*; copyright 2002; Date Downloaded: Dec. 15, 2005; 16 pages.
*AdvantGo User Guides*; copyright 1998-2005; Date Downloaded: Dec. 15, 2005; 1 page.
*Database Reference Guide for AvantGo Mobile Inspection 2.0*; copyright 2002; Date Downloaded: Dec. 15, 2005; 42 pages.
*Inspector Training Setup Guide*; copyright 2002; Date Downloaded: Dec. 15, 2005; 13 pages.
*Installation and Setup Guide for AvantGo Mobile Inspection, Version 2.0*; copyright 2002; Date Downloaded: Dec. 15, 2005; 46 pages.
*AvantGo version 3.x Palm User Guide*; Date Downloaded: Dec. 15, 2005; 91 pages.
*AvantGo version 3.x Pocket PC User Guide*; Date Downloaded: Dec. 15, 2005; 79 pages.
*AvantGo Version 5.7+ Palm User Guide*; Date Downloaded: Dec. 15, 2005; copyright 1998-2004; 60 pages.
*AvantGo Version 5.7+ Pocket PC User Guide*; Date Downloaded: Dec. 15, 2005; copyright 1998-2004; 64 pages.
mobilerss.net; http://www.mobilerss.net; Date Downloaded: Oct. 25, 2005; 2 pages.
mobilerss.net, about; http://www.mobilerss.net/about.php; Date Downloaded: Dec. 15, 2005; 1 page.
*Introduction to RSS*; http://www.webreference.com/authoring/languages/xml/rss/intro; copyright 2005; Date Created: Mar. 27, 2000; Date Revised: Apr. 14, 2003; Date Downloaded: Oct. 25, 2005; 3 pages.
*RSS Syndication and Aggregation*; http://www.webreference.com/authoring/languages/xml/rss/intro/2.html; copyright 2005; Date Created: Mar. 27, 2000; Date Revised: May 7, 2001; Date Downloaded: Oct. 25, 2005; 3 pages.
*WebRef and the Future of RSS*; http://www.webreference.com/authoring/languages/xml/rss/intro/3.html; copyright 2005; Date Created: Mar. 27, 2000; Date Revised: Mar. 27, 2000; Date Downloaded: Oct. 25, 2005; 3 pages.
*RSS*; http://www.webopedia.com/TERM/R/RSS.html; copyright 2005; Date Downloaded: Oct. 26, 2005; 3 pages.
*RDF*; http://www.webopedia.com/TERM/R/RDF.html; copyright 2005; Date Downloaded; Oct. 26, 2005; 2 pages.
U.S. Appl. No. 11/197,681, filed Dec. 29, 2008, Advisory Action.
U.S. Appl. No. 11/197,681, filed Mar. 20, 2009, Appeal Brief Filed.
java.net, Rome v0.4 Tutorial Using Rome to Convert a syndication feed from one type to another. Online, Retrieved from Internet Oct. 9, 2009, 2 pages http://web.archive.org/web/20051013055524/http://wiki.java.net/bin/view/Javawsxml/Rome04TutorialFeedConverter).
U.S. Appl. No. 11/332,883, filed Jan. 17, 2006, Van Valen, III.
U.S. Appl. No. 11/197,681, filed Oct. 25, 2007, Advisory Action.
U.S. Appl. No. 11/197,681, filed Nov. 28, 2007, Advisory Action.
U.S. Appl. No. 11/197,681, filed Jul. 7, 2009, Non-Final Office Action.
U.S. Appl. No. 11/332,883, filed Jan. 16, 2009, Non-Final Office Action.
U.S. Appl. No. 11/332,883, filed Jul. 2, 2009, Final Office Action.
U.S. Appl. No. 11/424,452, Nov. 2, 2009, Final Office Action.
U.S. Appl. No. 11/197,681, Nov. 5, 2009, Appeal Brief.

* cited by examiner

AUTOMATED CATEGORIZATION OF RSS FEEDS USING STANDARDIZED DIRECTORY STRUCTURES

CROSS-REFERENCE TO RELATED APPLICATIONS

This application is a continuation-in-part application of U.S. patent application Ser. No. 11/424,452, filed Jun. 15, 2006, which application is a continuation-in-part application of U.S. patent application Ser. No. 11/197,681, filed Aug. 3, 2005 and entitled "Enhanced Favorites Service for Web Browsers and Web Applications", both of which applications are incorporated herein by reference in their entireties. This application also claims the benefit of U.S. Provisional Application Ser. No. 60/736,553, filed Nov. 13, 2005 and entitled "Automated Categorization of RSS Feeds Using Standardized Directory Structures", which is incorporated herein by reference in its entirety.

BACKGROUND

1. The Field of the Invention

The present invention relates generally to enhancing web feed management, and more particularly, to methods and systems for creating a database of web feeds and providing web feed organizational assistance to users.

2. The Relevant Technology

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data.

Often, electronic communication on a network includes a client computer system (hereafter referred to as a "client") requesting access to a network service at a server computer system (hereinafter referred to as a "server," or "host"). Accordingly, the client sends a request to the server for particular access to its system resources, wherein if the client is authorized and validated, the service responds with a response message providing the desired information. Of course, other messaging patterns between client and service are available and include simple singleton messages as well as more sophisticated multi-message exchanges such as, e.g., notification, solicit-response, pub-sub patterns, polling, kick-push, queuing, and others. Further, these types of communication are governed by various requirements and capabilities defined by both the client and the service in contracts for distributed systems.

Along with computing systems, the Internet has revolutionized the way people communicate and receive information. In essence, the Internet includes a large constellation of networked computers that are spread out over much of the world. Sophisticated computers, software and networking technology have made communication over the Internet fairly straightforward from the view point of end user.

With the advent of the Internet, the World Wide Web has become an increasingly popular way to receive information. For example, rather than retrieving the latest news from television or newspapers, many people obtain the information they are seeking from numerous websites that are a mouse-click away. Recently, an increasing number of webpages are available related to news, weather, sports, entertainment, stocks, weblogs, and the like.

Because of the innumerable websites, categorized collections of websites have been created to assist in the organization and taxonomy of websites. One of the most popular of such collections is the Open Directory Project ("ODP"; http://www.dmoz.org). The ODP is a multilingual open content directory of World Wide Web links that is constructed and maintained by a number of editors. The organization of ODP is hierarchical, wherein each website listing is placed into a topical folder path. For example, some of the parent directories include Adult, Arts, Business, Computers, Games, Health, Home, News, Recreation, Reference, Regional, Science, Shopping, Society, and Sports. The ODP contains millions of website listings organized into thousands of categories. Other categorized collections of websites also exist, including, but not limited to, general directories such as the "Go directory" and Zeal, and specialized directories such as ChefMoz (a restaurant directory), and MusicMoz (a music directory).

The increase in the number of information sources on the Internet is accompanied by the risk that users will be deluded by available sources. When users amass a large number of preferred websites, the ability to visit each site to discover the content can be time consuming. To alleviate this problem, web feeds have been introduced to help users quickly scan the content of one or more web sites. Web feeds are a mechanism used for publishing regular updates of web-based content. Common web feed protocols include RSS ("Really Simple Syndication", or "Rich Site Summary"), Atom, and the like. Web publishers can use web feeds to provide updates to users, such as the latest news headlines or weblog postings. To view the updates, users typically use web feed "readers" or "aggregators" to collect and monitor their favorite feeds in one place.

Although the advent of web feeds and web feed readers has facilitated the ability to quickly browse the content of various web pages, web feeds can quickly become disorganized within a reader or aggregator as more feeds are added. Many users neglect the organization of their web feeds because of the time it takes to organize them, and because the users are unsure of a logical organization method.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

These and other limitations are overcome by embodiments of the present invention, which relate to systems and methods for creating a database of categorized web feeds. The database is generated by compiling a large number of web feeds, such as RSS feeds, and organizing the web feeds in accordance with taxonomy as determined by a categorized collection of websites.

The web feeds incorporated into the web feed directory may be ascertained from a variety of sources. In one embodiment, the server performs an independent search of various popular websites to find web feeds to be included in the web feed database. Alternatively, a client computer may communicate web feeds to the server via a network connection. For example, the user of the client computer may bookmark a favorite website. In doing so, the user's web browser may automatically search the website to find web feeds that may be associated with the website. If a web feed is found, the web feed is communicated to the server, which includes the web feed on the directory of categorized web feeds.

The web feeds may be organized in the web feed database by searching a categorized collection of websites corresponding to the location of the web feed, and determining folder path information for the web feed based on where in the collection of websites the web feed is located. Once folder path information is determined, the identifier of the web feed is placed into the web feed database in a folder path corresponding to its location in the categorized collection of websites. In one embodiment, the categorized collection of websites includes the ODP.

In one embodiment, the invention also includes providing folder information regarding the folder path of the web feed to a client computer. This information may be provided to a user of the client computer in the form of a suggestion for a folder within the user's personal web feeds database in which to place the web feed. In one embodiment, the user may configure the user's web browser to automatically accept the suggestion from the server, and place the web feed in with the user's personal web feed database in accordance with the suggested folder path. For example, the web feed may be added into the corresponding folder of the user's web feed aggregator, web feed reader, or web feed favorites. If the corresponding folder has not yet been created, the folder may also be created automatically if the user so elects.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The principles of the present invention relate to enhancements for web feed management. One embodiment provides a database of categorized web feeds stored at a central location that may be accessible by internet users. The feed identifiers may be categorized in accordance with an existing categorized collection of websites, such as the ODP. Another embodiment provides an internet user with access to the database of categorized web feeds to assist the user in organizing and managing the user's preferred web feeds.

As used herein, the phrase "web feed" refers to an XML-based document which contains content items, such as headline summaries of news articles or weblog posts, with web links to the full versions of the articles. Feeds are also used to deliver structured information ranging from stock reports to sports scores. Web feeds may employ various different formats, including RSS and "Atom", among other formats. Feeds may be subscribed to directly by users of online services or subscription readers called aggregators, which combine the contents of multiple web feeds for display on a single screen or series of screens. Similarly, the phrase "web feed identifier" refers to the address or URL that identifies the XML-based document in connection with the web feed. By way of example, an RSS feed may have the identifier 'http://www.example.com/news/12345.rss'.

Figure 1:
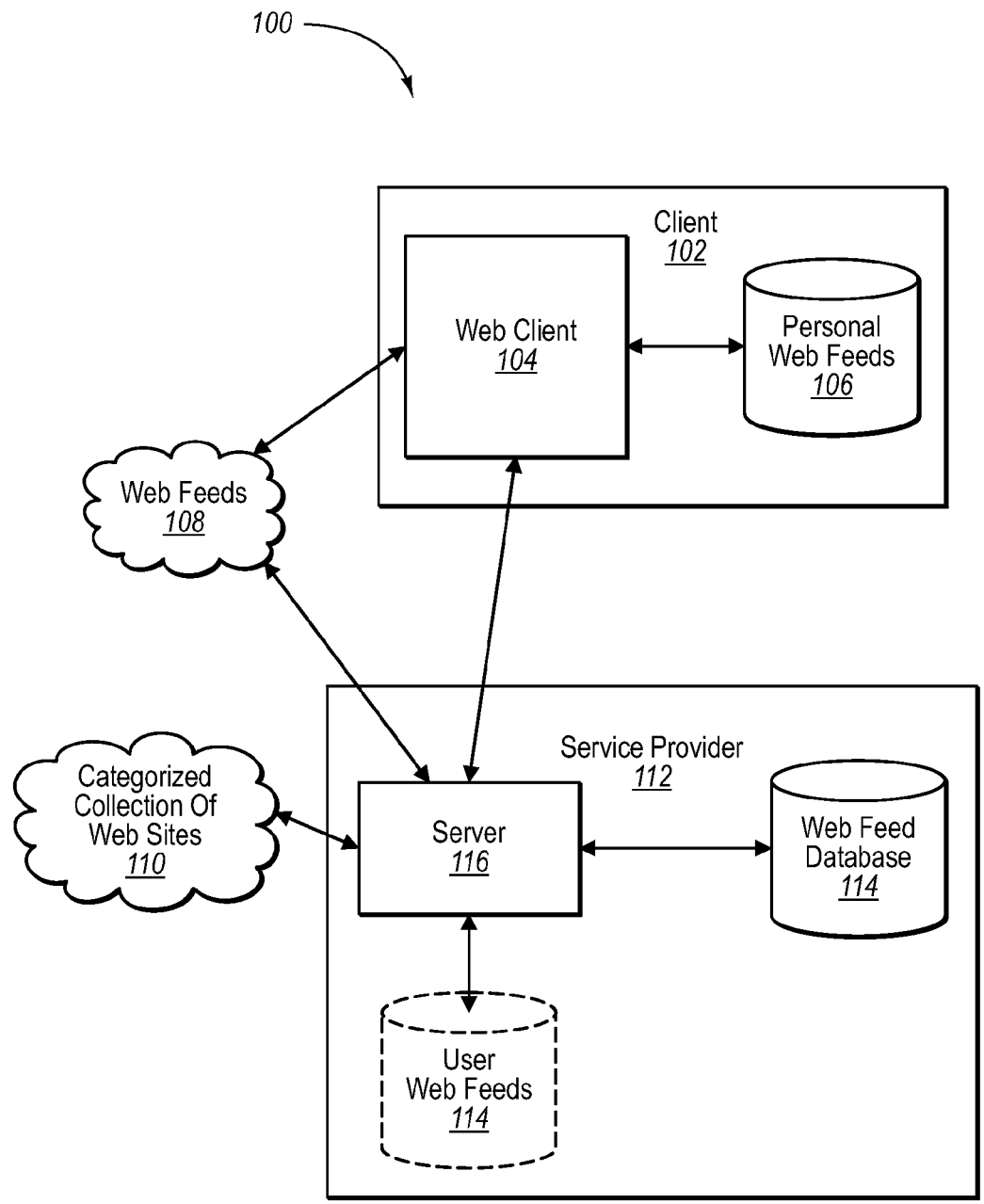
FIG. 1 illustrates a block schematic diagram showing an exemplary embodiment of a web feed database system architecture, according to one embodiment of the invention.

FIG. 1 schematically illustrates an exemplary system architecture 100 for implementing one embodiment of the present invention. A user of a client computer 102 may access web feed information 108 via a web client 104. For example, the user may be browsing an internet web page using the web client 104 and encounter a web feed that may be of interest to the user. Using an interface provided by web client 104, the user may submit the web feed identifier to a central server 116. The web client may communicate web feed information to and from the server 116 by issuing XML or HTTP commands.

The server 116 may receive web feed identifiers indirectly as well. For example, when a user adds a website to the user's website favorites folder, the user's web client 104 may automatically scrape (i.e., search) the website to determine if any web feeds are associated with the website. If and when web feeds are found, the feed identifiers may be automatically sent to the server 116.

When the server receives the web feed identifier information from the user, the server may first determine if the submitted web feed is already contained within its web feed database 114. The web feed database 114 is a large categorized collection of web feed identifiers created by the server 116. In one embodiment, the web feed directory is categorized according to a hierarchical structure. If the web feed identifier information is not already contained within the web feed database 114, the server 116 determines the subject matter of the submitted web feed so that the web feed can be added into the web feed directory dedicated to a subject matter similar to that of the submitted web feed. This determination is typically made by searching one or more existing public categorized collection of websites 110, such as the ODP, to find a hierarchical folder path containing websites referencing the web feed. The folder path information of the categorized collection of websites 110 will facilitate the automatic determination of the subject matter of the web feed. For example, a search may return the following hierarchical folder path information: 'Computers>Internet>Access Providers>International>Company A', meaning that the subject matter of the web feed identifier is related to Company A, which is an international internet service provider.

The server may be configured to always search a default categorized collection of websites first, and if the default service is unable to find any information regarding the web feed, the server 116 expands the search to other available categorized collection of websites. In one embodiment, the web feed database 114 may be part of an existing categorized collection of web sites, such as, but not limited to, the ODP directory. In this embodiment, the need to maintain a separate web feed database 114 is eliminated.

Many strategies may be employed in order to locate or identify the subject matter of the submitted web feed. In one embodiment, the server 116 first performs a search of a categorized collection of websites to determine if the web feed has already been categorized within the collection of web sites. For example, the submitted web feed identifier may include http://www.example.com/news/entertainment/12345.rss. Thus, the server 116 may first search the categorized collection of websites to determine if the service contains an exact match of the web feed identifier. The exact match may not be found if the web feed has not yet been added to the categorized collection of websites, or because many conventional categorized collection of websites only contain URLs for actual websites (as opposed to web feed URLs). Furthermore, many web feed identifiers continually change, and are therefore difficult to accurately maintain. Therefore, the exact web feed URL may be difficult to find within conventional categorized collection of websites. If the exact web feed identifier is not found during an initial search, then the server 116 may repeatedly truncate the web feed identifier being searched until a match is found. For example, the above URL may broaden the search to http://www.example.com/news/entertainment/ and, if that fails, then http://www.example.com/news, and so on. Eventually, the search will likely be broad enough to find a match within the categorized collection of websites 110. When a match is found, the hierarchical folder path within the categorized collection of websites 110 that contains the match is noted.

Alternatively, the server 116 may automatically perform a search for the root URL of the web feed. To continue the above example, the server may automatically search for www.example.com instead of searching for the full web feed identifier. Automatically searching the root URL may often generate faster results, but runs the risk of being less accurate. For example, if www.example.com contains news web feeds for both entertainment and sports, the results for a www.example.com search may indicate that the web feed is a "news" feed, even though the web feed is more accurately described as an "entertainment" feed. However, where no other information for a submitted web feed identifier can be found relating to the web feed on the categorized collection of websites 110, a search for the root URL can often be a good last resort.

An alternative technique for determining the subject matter of the submitted web feed is to search the categorized collection of websites 110 for the parent website from which the web feed originated. For example, assume that an RSS feed having the URL http://rss.example.com/rss/example_technology.rss was found on a parent website having the URL http://www.example.com/example/. Instead of searching the categorized collection of websites 110 for the web feed URL, a search is made for the parent website URL. The hierarchical folder path for the parent website is often a good indicator of the subject matter of the web feed because it is likely that the topic for the web feed is similar to the topic of the parent website.

The above techniques for determining the subject matter for the submitted web feed are merely provided by way of example. Other techniques may be employed, as will be appreciated by one of ordinary skill in the art. Furthermore, an additional relevancy analysis may be conducted by evaluating the content of the web feed to determine the most relevant category and comparing the resulting category with the initially determined subject matter. If a desired relevancy level is not obtained, multiple techniques may be employed where a first technique does not produce a satisfactory result.

After determining the subject matter of the web feed, the server 116 identifies or creates a folder path within the web feed database 114 that corresponds to the hierarchical folder path found within the categorized collection of websites 110. If a comparable folder path already exists, the web feed identifier is placed in the web feed database 114 within the comparable folder. However, because of the expansiveness of the categorized collection of websites 110, it will often be the case that the comparable folder will not have been generated within the web feed database 114. If no such folder exists in the web feed database 114, the server may either determine the closest available alternative, or may create a new folder path that matches the categorized collection of websites hierarchical folder path. After the server 116 selects a folder within the web feed database 114, the server stores the web feed identifier within the selected folder. In embodiments where the web feed database 114 is part of an existing web directory service (e.g., ODP), the server 116 places the web feed identifier within an appropriate folder path as identified in the above process.

Once the web feed identifier has been added to the web feed database 114, the system may be further configured to offer a suggested folder path to users that have expressed interest in the web feed identifier. This feature is beneficial to users who store a large number of web feeds in a web feed aggregator or reader. Users are typically required to place web feeds into predefined folder locations, and are given little assistance in determining a proper folder for organizing the user's web feeds. Where an aggregator or reader does provide the user with the option of creating new folders, the aggregator or reader typically leaves the decision of taxonomy and organization of the folders up to the user. However, a user having many web feeds may become overwhelmed with the task of organizing web feeds, particularly where the user has neglected the organization for a prolonged period of time.

Therefore, the present invention may be further configured to automatically organize the user's web feeds, or to automatically provide the user with suggested folders for the web feeds. In one example embodiment, the user submits a web feed identifier to the server 116 in a similar manner as described above. The server 116 determines a suggested folder path by locating the web feed identifier in the web feed database 114, or by searching for folder information in a categorized collection of websites 110, as previously described. In one embodiment, the server 116 returns the folder suggestion to the user, and the user may manually update the user's personal collection of web feeds 106, which may be organized in a web feed aggregator, reader, or the like.

In another embodiment, the user is provided with the opportunity to select whether to accept the suggestion. If the user accepts the suggestion, the user's personal collection of web feeds 106 is automatically updated by placing the submitted web feed into a folder corresponding to the suggested folder. In another embodiment, the user may configure the web client 104 to accept the folder suggestions by default, thereby completely automating the process. If the user selects to accept the folder suggestion, the proper folder is automatically created within the user's client program if necessary, and the web feed is automatically stored within that folder. In order for a user to automatically update his or her personal web feeds 106, the user's web feed aggregator or reader is typically preconfigured to perform the automatic update. One example of such a web feed organization interface is described below in FIGS. 2-7.

Although FIG. 1 illustrates the user's personal web feeds 106 as being located at the user's client computer 102, the user's personal web feed database may be stored in an alternative location. For example, many web feed aggregator or reader providers maintain each user's personal web feed database at a web server maintained by the aggregator or reader provider. To access the user's web feeds, the user is typically required to logon to the user's online account, after which the user is able to navigate the user's personal web feeds. In this case, the user may receive a folder path suggestion from the server 116, and manually update the user's web feeds via the interface provided by the aggregator or reader provider. Alternatively, the service provider 112 may optionally provide a central database of user web feeds 118 for maintaining the web feed preferences of each user. Maintaining a central database of user web feeds provides the advantage of allowing users to obtain their personal web feed preferences from any location, as opposed to limiting their use of their personal web feeds to their personal computers.

In embodiments where a web feed identifier is sent to server 116 and the web feed identifier is not located in either the web feed database 114 or any of the categorized collection of websites 110, the server 116 may use a pattern matching algorithm to suggest an appropriate folder path. In one embodiment, Media Metrix can be used to prepare a list of keywords that correspond to identified channels, with the channels being the broadest categories as defined by an administrator of server 116. The server 116, using this list of keywords, can then determine whether the web feed identifier closely matches any of the suggested keywords to identify an appropriate pattern match. The server 116 can then use this suggested folder path to create a folder path in web database 114 and/or categorized collection of websites 110 for organizing the web feed identifier as well as auto-suggesting an appropriate folder for a user to store the web feed.

In another embodiment, the invention is further configured to allow a user to integrate web feeds into the user's favorites (or bookmarks) folder. Therefore, in addition to a user's conventional website favorites folder, the user is provided with the ability to generate a web feed favorites folder that is integrated into the user's existing webpage favorites, or select from an existing folder. This embodiment is illustrated in FIGS. 2-7.

Figure 2:
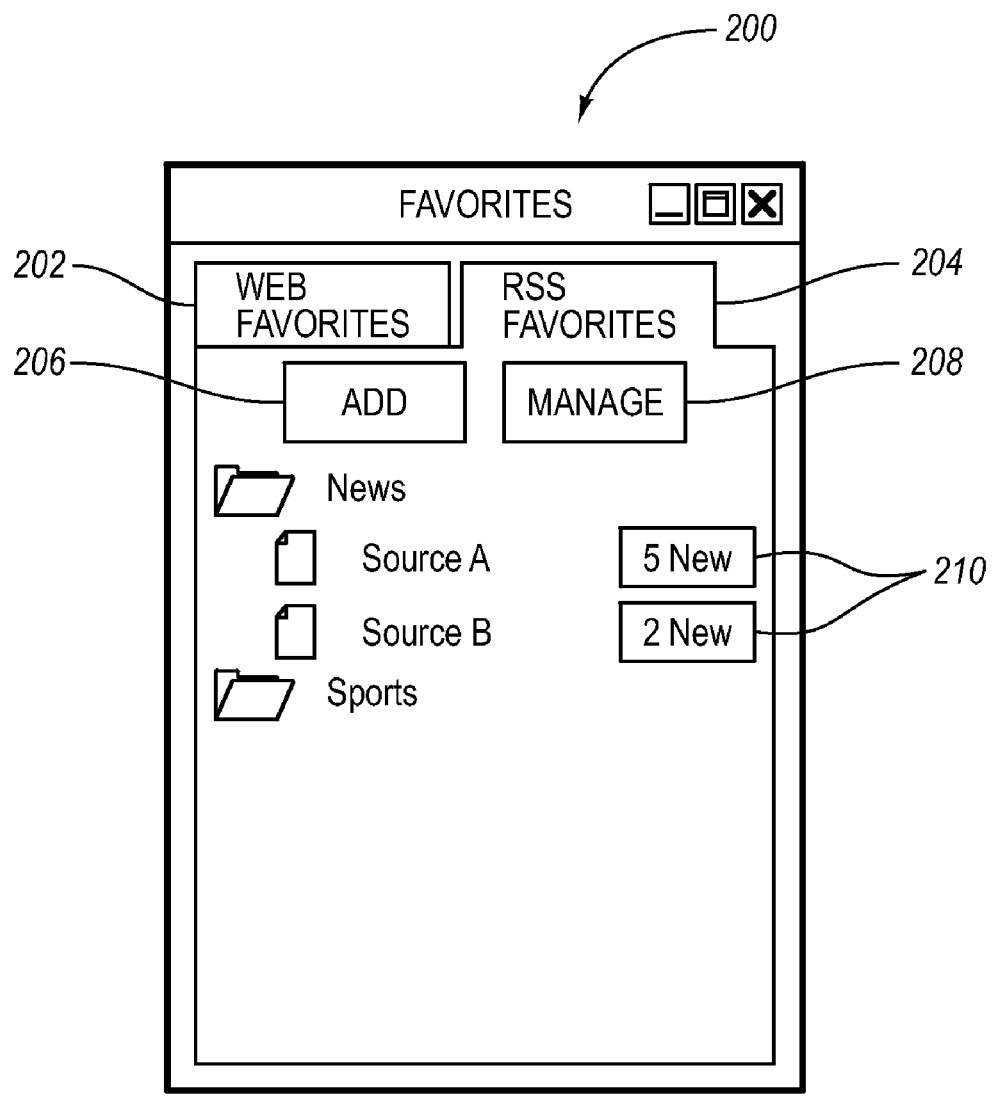
FIG. 2 is a screen shot showing the organization of RSS favorites in a collapsed view according to one embodiment of the invention.
Figure 3:
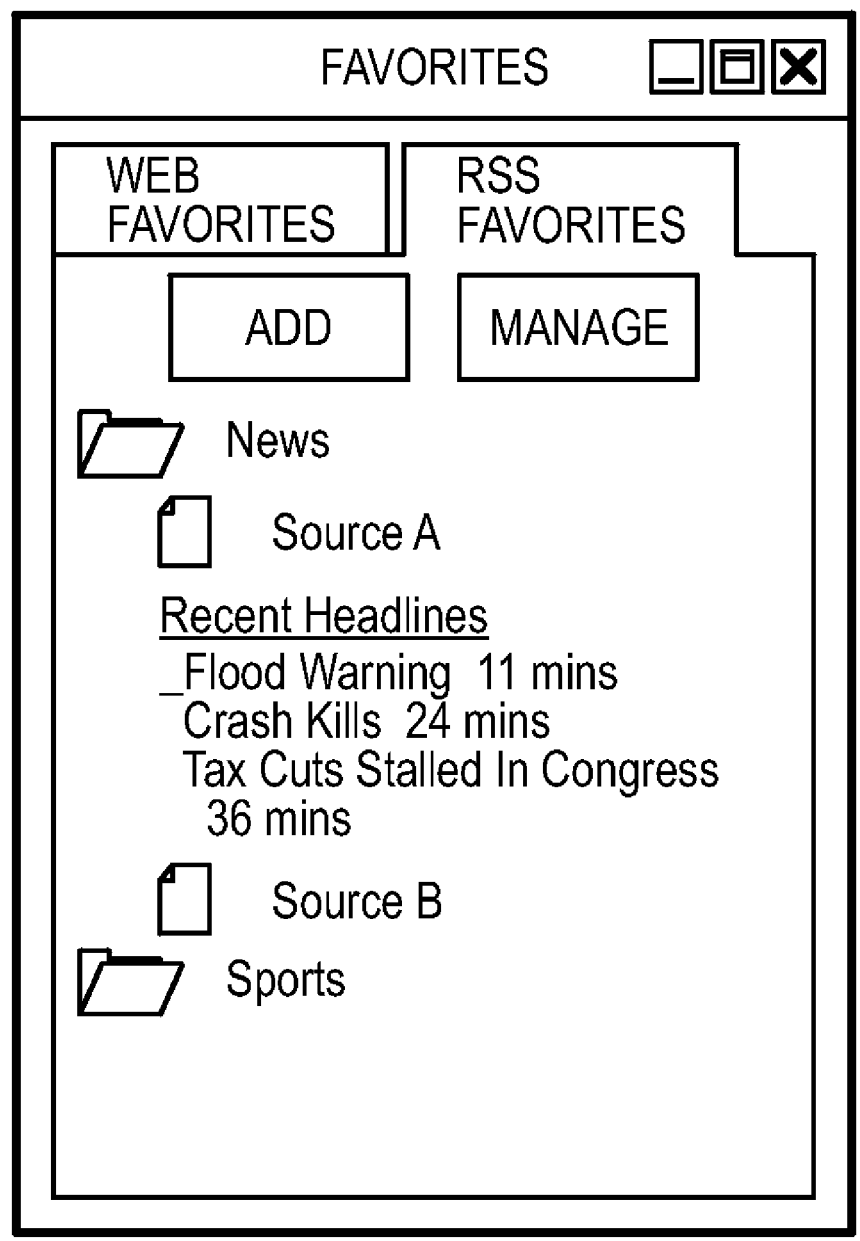
FIG. 3 is a screen shot showing the organization of RSS favorites in an expanded view according to one embodiment of the invention.

FIG. 2 is a graphical user interface 200 for allowing a user to integrate web feeds such as RSS feeds into the user's favorites, and for allowing the user to automate the categorization of the RSS feeds. In the embodiment shown, the user's favorites are separated into "Web Favorites" 202 and "RSS Favorites" 204, and the user is allowed to alternate between views. However, as one of skill in the art will appreciate, the integration of RSS favorites into a user's web favorites may employ various formats. For example, the RSS Favorites and Web Favorites may be combined into one viewable screen. The user is offered the option of adding a new RSS feed favorite with icon 206 and managing the RSS feed favorites with icon 208. The existing folders (e.g., "News" and "Sports") are displayed to the user. When the user selects a folder by clicking on the folder, the contents of the folder are expanded. The contents of each folder may contain both RSS feed links (such as "Source A" and "Source B", as shown) and additional subfolders.

To view RSS data from a particular source, the user selects the corresponding RSS feed link. Upon selecting the source, the contents of the RSS feed are displayed to the user. For example, in FIG. 3, upon clicking "Source A", the most recent headlines from Source A are displayed to the user in line with the user's other RSS favorites. The user may select one of the headlines, and the service will redirect the user's browser to the corresponding article. The user interface 200 may customize the display of the feeds if necessary. For example, the interface 200 may be configured to only display the five most recent headlines, ordered by descending date. Furthermore, because screen space is at a premium, the interface 200 may be configured to truncate each headline so that each headline fits on a single line.

An additional feature may include display 210 containing information regarding the recentness of articles contained in each feed. For example, the display 210 may contain the number of new articles that have been posted within the past day or hour. A new article display may also be provided for each folder, and may show if there are one or more new feeds contained anywhere in the folder or enclosed folders. Instead of displaying the number of new articles, display 210 may include an icon, such as a star or sun, when new articles are present. Alternatively, the display 210 may be configured such that it is only displayed to the user when the user places a mouse arrow over the corresponding folder or RSS feed.

Those skilled in the art will appreciate that any number of headlines may be displayed and that such headlines may be displayed in any order. Additionally, a user preference dialog may be provided to allow the user to select parameters such as number of headlines displayed, order of display, number of characters to display, and the like. Further, the user preference dialog may allow the user to configure preferences for the new feed display 210, such as the duration of time for which articles are considered "new." In addition, the user preference dialog may allow the user to select whether the categorization of RSS feeds will be automatically updated, or whether the user will be provided the option of accepting the suggested folder after each RSS feed submission.

Figure 4:
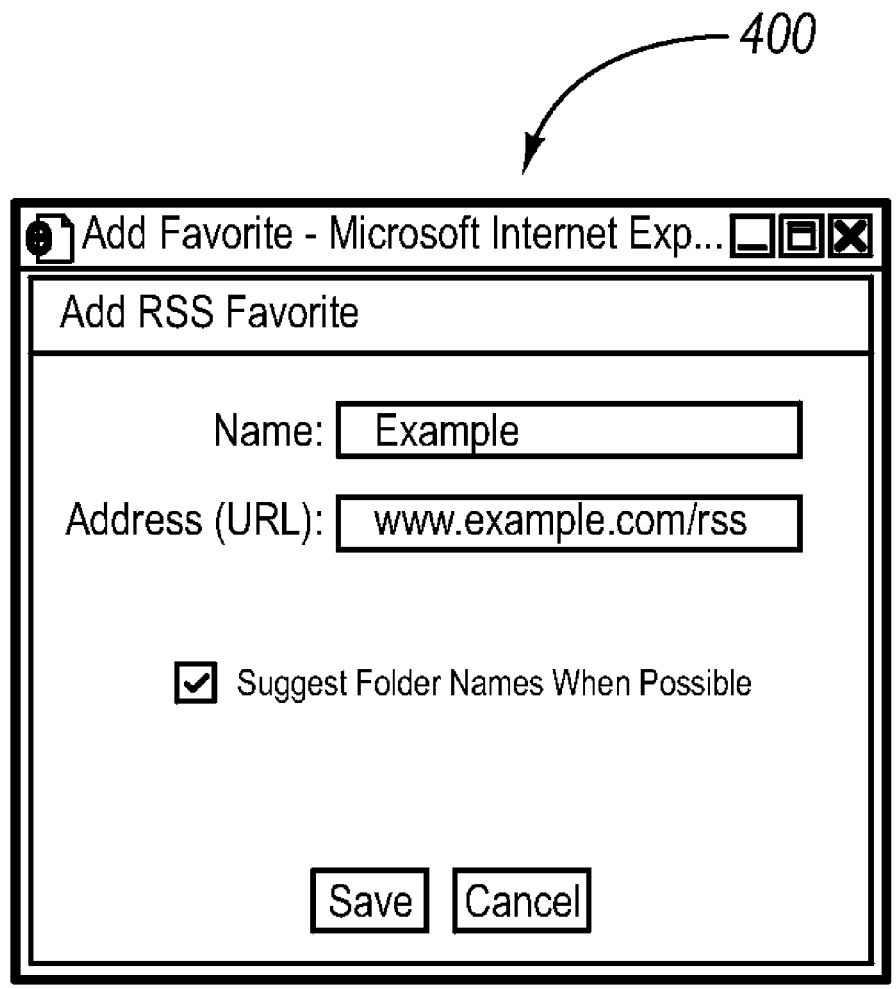
FIG. 4 illustrates an "add RSS favorite" form according to one embodiment of the invention.

To add a new RSS favorite, the user clicks the "ADD" icon 206, which opens the Add RSS Favorite screen 400 shown in FIG. 4. The interface prompts the user to enter the address (or identifier) of an RSS feed, and further provides the user with the option of having the system suggest folder names when possible. Optionally, the interface may prompt the user for a name of the RSS feed.

After the user submits an RSS feed identifier, the server 116 determines a suggested folder by locating the web feed identifier in the web feed database 114, or by searching for folder information in a categorized collection of websites 110, as previously described.

Figure 5:
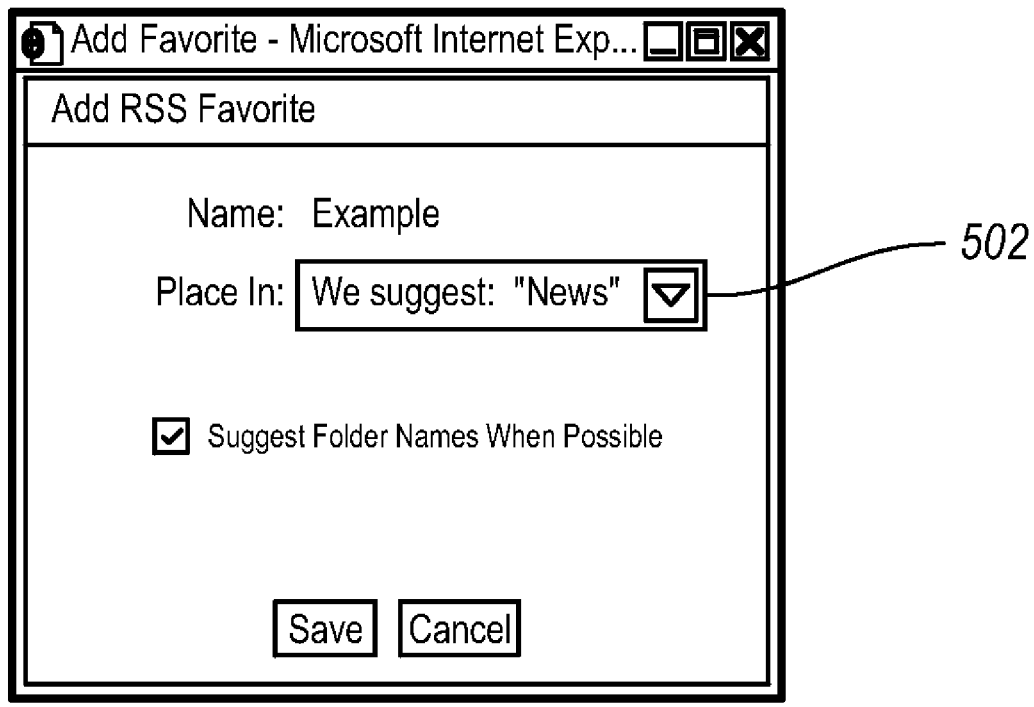
FIG. 5 is a screen shot showing folder suggestions according to one embodiment of the invention.

FIG. 5 is a screen shot showing folder suggestions according to the present invention. In the event that a suggested folder is found for the new favorite, the pull-down 502 defaults to that folder. FIG. 5 shows the folder with the name boldfaced, and a special icon to denote that it is a suggested folder.

Figure 6:
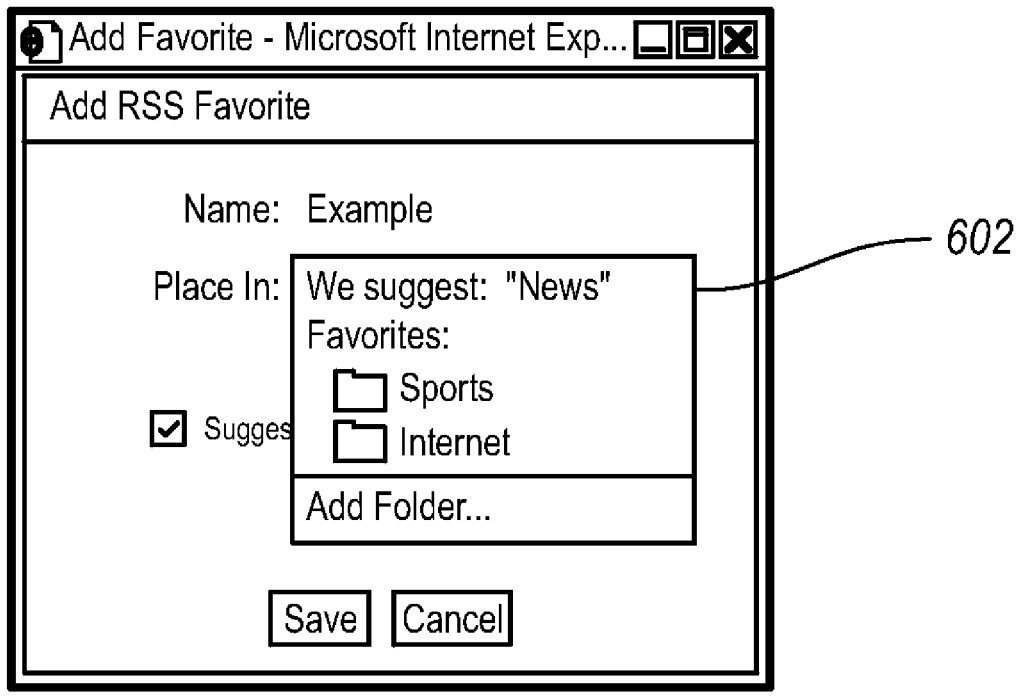
FIG. 6 is a screen shot showing a folder pull-down menu according to one embodiment of the invention.

FIG. 6 is a screen shot showing a folder pull-down menu 602 according to the invention. The pull-down menu 602 allows the user to select between a suggested folder name, and any of the existing folders within the user's RSS favorites. In one embodiment, the menu shows folder icons, and uses indentation to represent hierarchy.

In one embodiment of the invention, the hierarchical folder structure of the web client's RSS favorites is automatically minimized in order to simplify navigation by the user of client 102. For example, assume that the suggested folder path for Company A, as generated by the server 116, is 'Computers>Internet>Access Providers>International>Company A.' However, the user's current favorites database has not yet created a folder for 'Computers', because no web feed favorite has been created that would fall within the 'Computer' parent folder.

Rather than create an entire path of folders ('Computers', 'Internet', 'Access Providers', 'International', and 'Company A'), which may be tedious for the client to navigate, the system may simplify the structure by only creating a 'Computers' folder, and placing the RSS feed information for 'Company A' directly in the 'Computers' folder. This structure is much more simple for the user to navigate, and will normally still be logically correct (i.e., 'Company A' still logically fits within a 'Computers' category). However, if the user later requests a folder suggestion for an RSS feed related to a generic Internet website, and the server 116 responds by suggesting the new RSS feed be placed in the 'Computers>Internet' folder, the system may respond by creating the 'Computers>Internet' folder, placing the new RSS feed information within the 'Internet' folder, and also moving the 'Company A' web feed information into the 'Internet' folder. Therefore, 'Company A' is one step closer to the folder path as originally suggested by the server 116. As the user adds more web feeds, the user's hierarchical folder structure can be as simple or as complex as the user desires. For example, the user may select that folder paths be allowed to be auto-suggested to 3 or 4 sub-levels, if desired, allowing the folder to grow more complex to meet the demands of the user, without making the structure larger and more burdensome than required.

In one embodiment of the invention, the server imports the user's existing web feed folders and takes the existing folder structure into account when making a folder suggestion determination. For example, if the server determines that an RSS feed belongs in a folder path called 'Sports>Basketball>NBA>Teams>Players', and determines that the user already has a folder called 'Basketball>NBA', the server may suggest that the RSS feed be placed in the NBA folder, instead of suggesting that all of the other subfolders be created. As another example, if a user requests folder information for a web feed and the server is unable to find any folder information for the feed from any of the available web database services, the server may import the user's local favorites folders to determine if the RSS feed may fall within any of the user's existing folders. To make this determination, the server may search for related terms, or for related feeds already within the user's saved RSS feeds.

Figure 7:
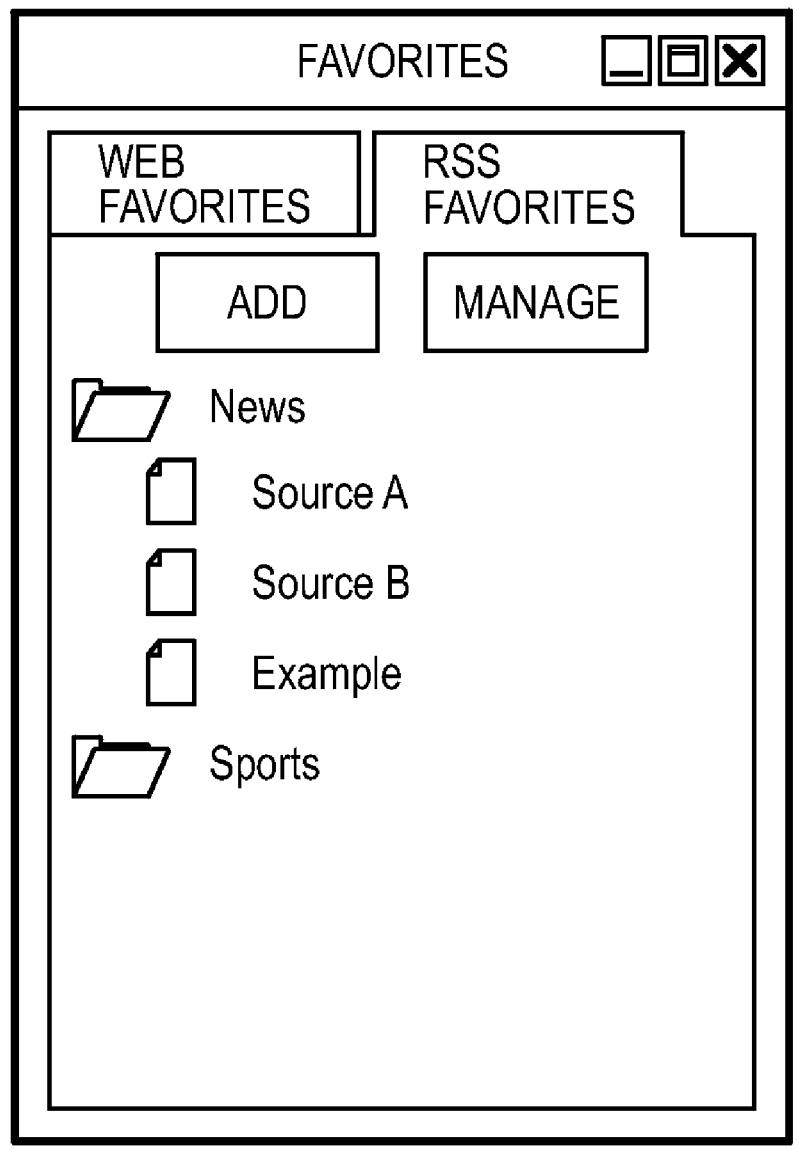
FIG. 7 is a screen shot of the RSS favorites of FIG. 2 following the addition of an RSS feed, according to one embodiment of the invention.

After a folder suggestion is provided to the user and the user accepts the suggestion, the folder is created within the user's RSS favorites, if needed (i.e., if the folder does not already exist), and the RSS feed is added to the folder. FIG. 7 illustrates a screen shot showing the RSS Favorites folder having the new "Example" RSS feed included in the suggested "News" folder.

Referring back to FIG. 2, the user may also be provided the option of automatically managing web feed favorites by pressing the "MANAGE" icon. Pressing the Manage icon opens a screen which provides the user with various options for organizing favorites. The user may be provided with the ability to manually organize the RSS favorites, similar to conventional webpage favorites dialogs. In addition, the user may be provided with the ability to request folder suggestions from the central server 116. The user may either request suggestions for individual web feeds, or may select an option that will automatically update the user's entire web feed favorites folder.

Figure 8A:
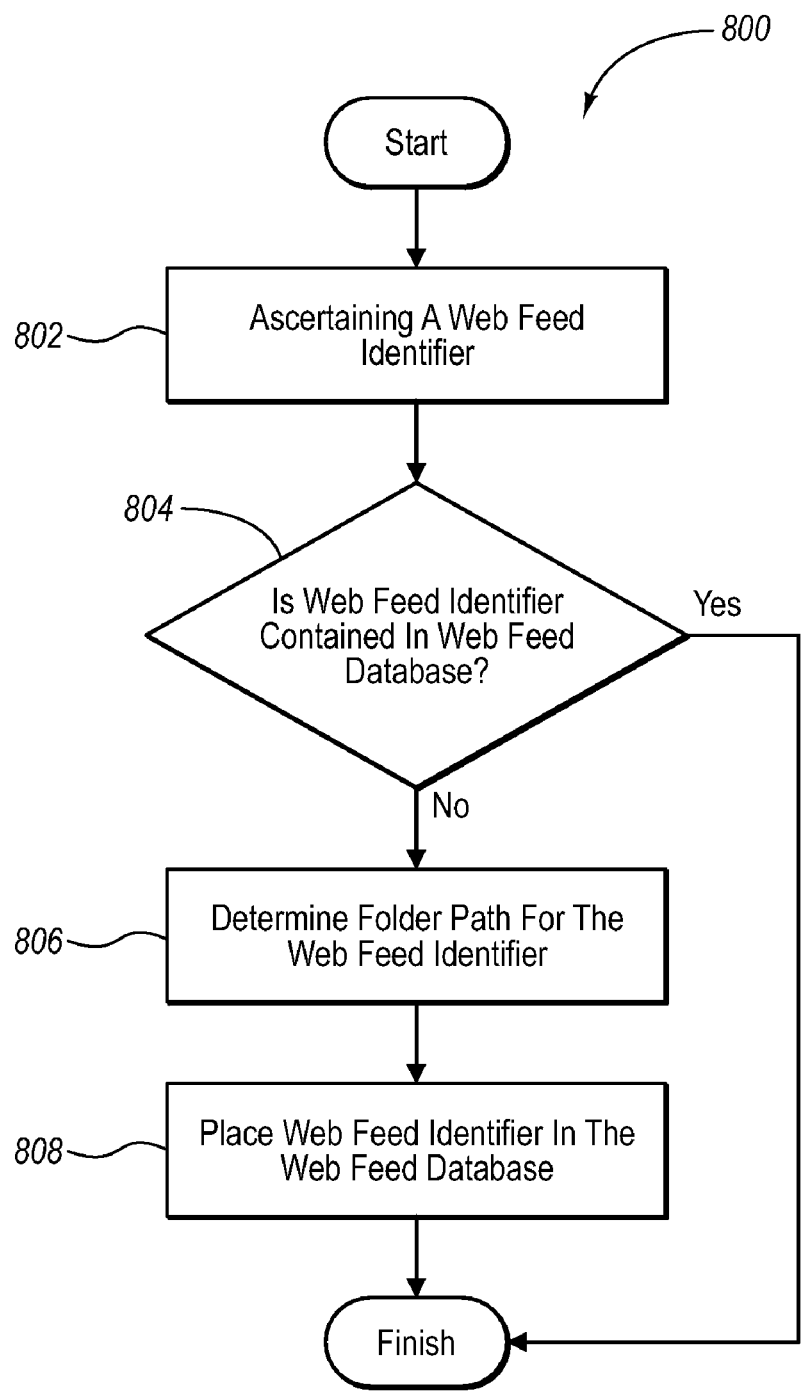
FIG. 8a is a flow diagram for the creation of an RSS database, according to one embodiment of the invention.
Figure 8B:
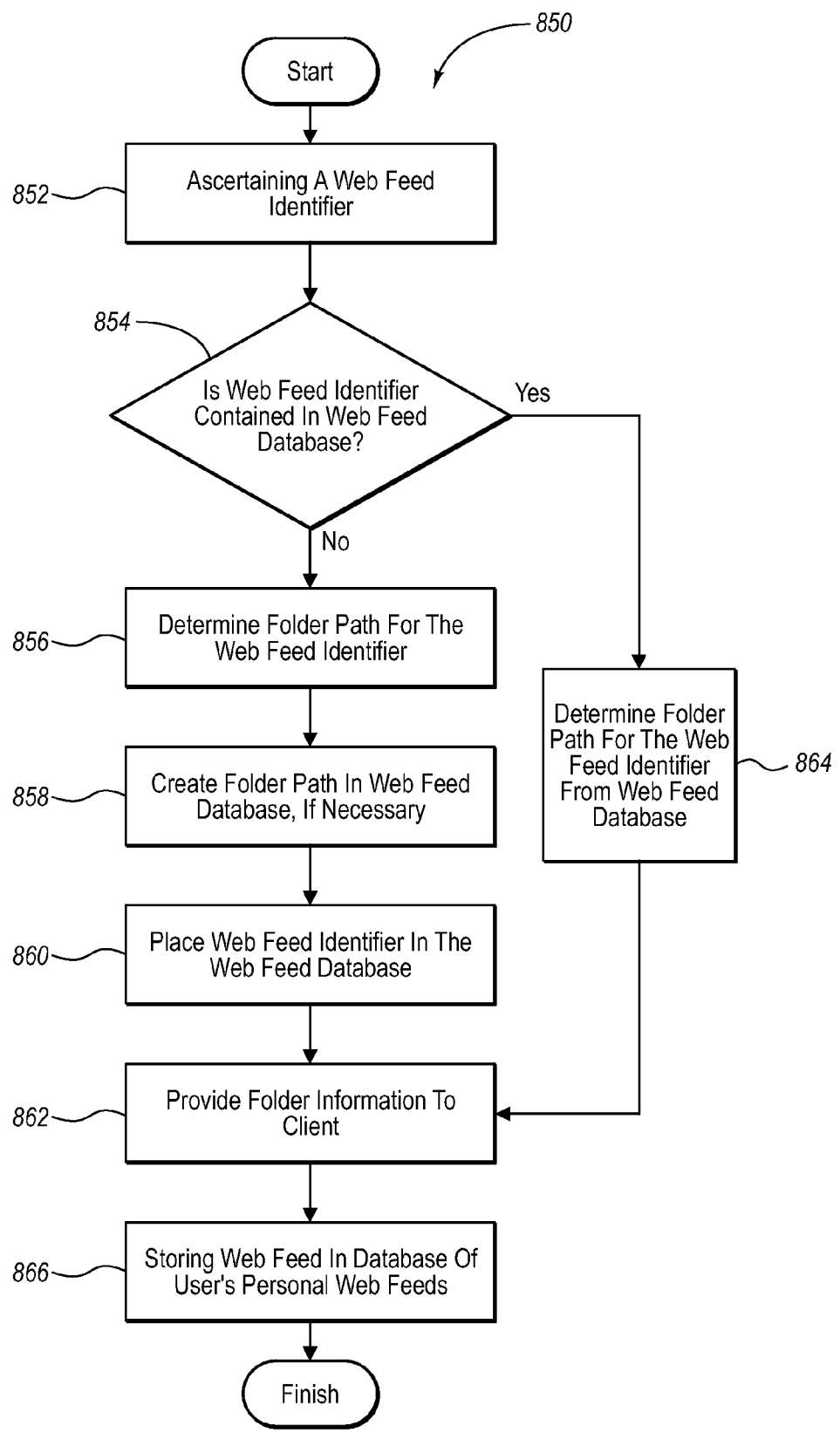
FIG. 8b is a flow diagram for assisting a user of a client computer with organization of web feed, according to one embodiment of the invention.

FIGS. 8a and 8b illustrate flow diagrams for exemplary embodiments of the present invention. The following description of FIGS. 8a and 8b will occasionally refer to corresponding elements from FIGS. 1-7. Although reference may be made to a specific element from these figures, such elements are used for illustrative purposes only and are not meant to limit or otherwise narrow the scope of the present invention unless explicitly claimed.

FIG. 8a illustrates a flow diagram for a method 800 of creating a database of categorized web feeds. The method 800 includes, at 802, ascertaining a web feed identifier. The web feed identifier may be ascertained from various sources, including submission from a user of a client computer, and a search performed by a computer or human.

The method 800 may further include, at 804, determining whether the web feed identifier is contained within a database of categorized web feeds. As illustrated in FIG. 1, server 116 may search its web feed database 114 in order to make this determination. If the web feed identifier is already contained in the database of categorized web feeds, then the creation of the web feed database is complete, since no further actions need to be taken in order to add the web feed to the database.

If it is determined at 804 that the web feed identifier is not contained in the web feed database, method 800 further includes, at 806, searching a categorized collection of websites to determine a hierarchical folder path for the web feed identifier. For example, the ODP may be searched in order to determine a hierarchical folder path wherein the web feed of interest may logically reside.

Once the hierarchical folder path is determined, the web feed identifier is placed in a corresponding hierarchical folder path within the database of categorized web feeds, at 808. If the corresponding hierarchical folder path does not yet exist in the web feed database, the corresponding folder path is created within the database. One reason the corresponding hierarchical folder path may not yet exist is because no web feed has yet been added to the web feed database within the corresponding hierarchical folder path.

FIG. 8b illustrates a flow diagram for a method 850 of organizing web feeds on a client computer. The method 850 includes, at 852, ascertaining a web feed identifier, for example, by receiving the web feed from a client computer. As described above in reference to FIG. 1, a user of a client 102 may affirmatively submit a web feed to the server 116. Alternatively, when a user bookmarks one of his or her favorite websites, the user's browser may automatically scrape the website to determine if any web feeds are associated with the website. If web feeds are found, the feed identifiers may be automatically sent to the server 116.

The method 850 may further include, at 854, determining whether the web feed identifier is contained within a database of categorized web feeds. If the web feed identifier is already contained in the database of categorized web feeds, then the method 850 further includes, at 864, determining a hierarchical folder path within the database of categorized web feeds for the web feed identifier. Once the folder path of the web feed is determined, method 850 may further include providing the folder information to the client computer, at 862.

If it is determined at 854 that the web feed identifier is not contained in the web feed database, method 850 further includes, at 856, searching a categorized collection of websites, such as the ODP, to determine a hierarchical folder path for the web feed identifier.

Once the hierarchical folder path is determined, the web feed identifier is placed in a corresponding hierarchical folder path within the database of categorized web feeds, at 860. If the corresponding hierarchical folder path does not yet exist in the web feed database, the corresponding folder path is first created within the database, at 858.

Finally, after the web feed has been added to the web feed database, the method 850 includes, at 862, providing a client computer with the folder information. For example, as illustrated in FIG. 1, the server 116 may communicate the folder information regarding the hierarchical folder path to the client 102. Once the folder information has been communicated to the client 102, the web client 104 may add the web feed to the user's personal repository of web feeds 106 or 118 within the suggested folder path. The user's personal repository of web feeds may display the web feeds to the user in the form of a web feed reader, a web feed aggregator, or the user's "favorites" or "bookmarks" customized for storing web feeds.

As described previously, the web feeds of the above methods may use various web feed formats. For example, the web feeds may have an RSS feed format, an Atom feed format, and the like.

Accordingly, the principles of the present invention relate to the generation of a large categorized database of web feed identifiers. The database is generated by ascertaining web feed identifiers, potentially from users of the internet. When a user adds a favorite (bookmark) to their personal database of favorites, the web client can "scrape" or read the content (web site) of the corresponding favorite. In doing so, the web client can determine if the web site had any feeds on it, and send these web feed identifiers to the server. The server can then use these to augment the web feed database. If the web feed database still does not contain the web feed identifier, the server searches for information regarding the web feed identifier in a categorized collection of websites, such as the ODP. The categorized collection of websites returns information regarding a folder path in which the web feed identifier resides. The server adds the web feed identifier into a folder corresponding to that of the categorized collection of websites. Finally, the server may return a folder path suggestion to the user, and automatically update the user's personal web feed directory. The user's web feed directory may be configured to allow the user to access the web feed data directly from the user's favorites folder.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for creating a database of categorized web feeds, the method comprising:
    ascertaining a web feed identifier;
    without the user having to specify a category associated with the web feed identifier, using aspects of the web feed identifier for searching a categorized collection of websites to determine a hierarchical folder path for the web feed identifier;
    comparing the categorized collection of websites with aspects of the web feed identifier to determine a categorization of a website corresponding to the web feed identifier;
    providing the client computer with the categorization of the website corresponding to the web feed identifier as a suggested hierarchical folder path for the web feed identifier;
    receiving input from the user accepting the suggested hierarchical folder path;
    placing the web feed identifier in a corresponding hierarchical folder path within the database of categorized web feeds such that the web feed identifier is accessible from the database of categorized web feeds and displayable on the client computer according to the associated corresponding hierarchical folder path
    dynamically displaying on the client computer the web feed identifier in a top level of the hierarchical folder path when the web feed identifier is the only web feed identifier in a favorites database maintained by the client computer that corresponds to the top level of the hierarchical folder path; and
    dynamically displaying on the client computer the web feed identifier in a sub-level of the hierarchical folder path when more than one web feed identifiers are in the favorites database maintained by the client computer that correspond to the top level of the hierarchical folder path.

2. The method as recited in claim 1, wherein ascertaining a web feed identifier further includes receiving the web feed identifier from a client computer.

3. The method as recited in claim 1, further comprising determining if the web feed identifier is already contained within the database of categorized feeds prior to searching the categorized collection of websites to determine the hierarchical folder path and placing the web feed identifier in the corresponding hierarchical folder path within the database of categorized web feeds.

4. The method as recited in claim 1, wherein the categorized collection of websites includes the Open Directory Project.

5. The system as recited in claim 1, wherein the web feeds include feeds having a "Really Simple Syndication" or Atom format.

6. The method as recited in claim 1, wherein the determination of the hierarchical folder path for the web feed identifier includes searching the categorized collection of websites for the web feed identifier, and repeatedly truncating the web feed identifier until the remaining web feed identifier is found within the categorized collection of websites.

7. The method as recited in claim 1, wherein the determination of the hierarchical folder path for the web feed identifier includes determining a website on which the web feed is located, and determining the hierarchical folder path for the website.

8. A computer implemented method for organizing web feeds on a client computer, the method comprising:
    ascertaining a web feed identifier;
    without the user having to specify a category associated with the web feed identifier, using aspects of the web feed identifier for searching a database of categorized web feeds that is organized in accordance with the organizational scheme of a categorized collection of websites to determine a hierarchical folder path containing topics related to the web feed identifier;
    comparing aspects of the web feed identifier with the categorized collection of websites to determine a categorization of a website corresponding to the web feed identifier;
    providing a client computer with the categorization of the website corresponding to the web feed identifier as the hierarchical folder path in the form of a suggestion for allowing a user to create a database containing the user's personal web feeds using the organizational scheme of the database of categorized web feeds;
    receiving input from the user accepting the suggested hierarchical folder path;
    placing the web feed identifier in a corresponding hierarchical folder path within the database of categorized web feeds such that the web feed identifier is accessible from the database of categorized web feeds and displayable on the client computer according to the associated corresponding hierarchical folder path;
    dynamically displaying on the client computer the web feed identifier in a top level of the hierarchical folder path when the web feed identifier is the only web feed identifier in a favorites database maintained by the client computer that corresponds to the top level of the hierarchical folder path; and
    dynamically displaying on the client computer the web feed identifier in a sub-level of the hierarchical folder path when more than one web feed identifiers are in the favorites database maintained by the client computer that correspond to the top level of the hierarchical folder path.

9. The method as recited in claim 8, further comprising automatically storing the web feed identifier in a directory within the database containing the user's personal web feeds that corresponds to the hierarchical folder path.

10. The method as recited in claim 8, wherein ascertaining a web feed identifier further includes receiving the web feed identifier from the client computer.

11. The method as recited in claim 8, wherein ascertaining a web feed identifier further includes receiving a web page identifier from the client computer and searching the web page for the web feed identifier.

12. The method as recited in claim 8, further comprising:
    creating a directory corresponding to the hierarchical folder path within the database containing the user's personal web feeds.

13. The method as recited in claim 8, wherein the web feeds include feeds having a "Really Simple Syndication" format.

14. The method as recited in claim 8, wherein in the event that the database of categorized web feeds does not contain the web feed identifier, the method further comprises:
    searching the categorized collection of websites to determine a hierarchical folder path for the web feed identifier; and
    placing the web feed identifier in a corresponding hierarchical folder path within the database of categorized web feeds.

15. The method as recited in claim 8, wherein the categorized collection of websites includes the Open Directory Project.

16. A system for assembling a compilation of categorized web feeds, the system comprising:
    a central server comprising:
        a communication mechanism for receiving a web feed identifier submission from a client computer and for transmitting a folder suggestion for the web feed identifier submission to the client computer without the user having to specify a category associated with the web feed identifier,
        a central database for categorically storing the web feed identifier such that the web feed identifier is accessible from the central database and displayable on the client computer according to the folder suggestion, and
        a processor using aspects of the web feed identifier for searching a hierarchical organization of websites to compare aspects of the web feed identifier with the hierarchical organization of websites to determine a categorization of a website corresponding to the web feed identifier to determine a hierarchical storage path within the central database for storing the web feed identifier; and
    the client computer configured to received the folder suggestion, the client computer comprising:
        a favorites database for storing the folder suggestion, and
        a user interface for dynamically displaying the web feed identifier (1) in a top level of the hierarchical folder path when the web feed identifier is the only web feed identifier in the favorites database that corresponds to the top level of the hierarchical folder path, and (2) in a sub-level of the hierarchical folder path when more than one web feed identifiers are in the favorites database that correspond to the top level of the hierarchical folder path.

17. The system as recited in claim 16, wherein the hierarchical organization of websites is the Online Directory Project.

18. The system as recited in claim 16, wherein the web feeds include feeds having a "Really Simple Syndication" or Atom format.

* * * * *